F. X. PFOHL.
AUTOMATIC COUNTING, STACKING, AND TRANSFERRING APPARATUS.
APPLICATION FILED MAY 7, 1920.
1,412,795. Patented Apr. 11, 1922.
8 SHEETS—SHEET 1.
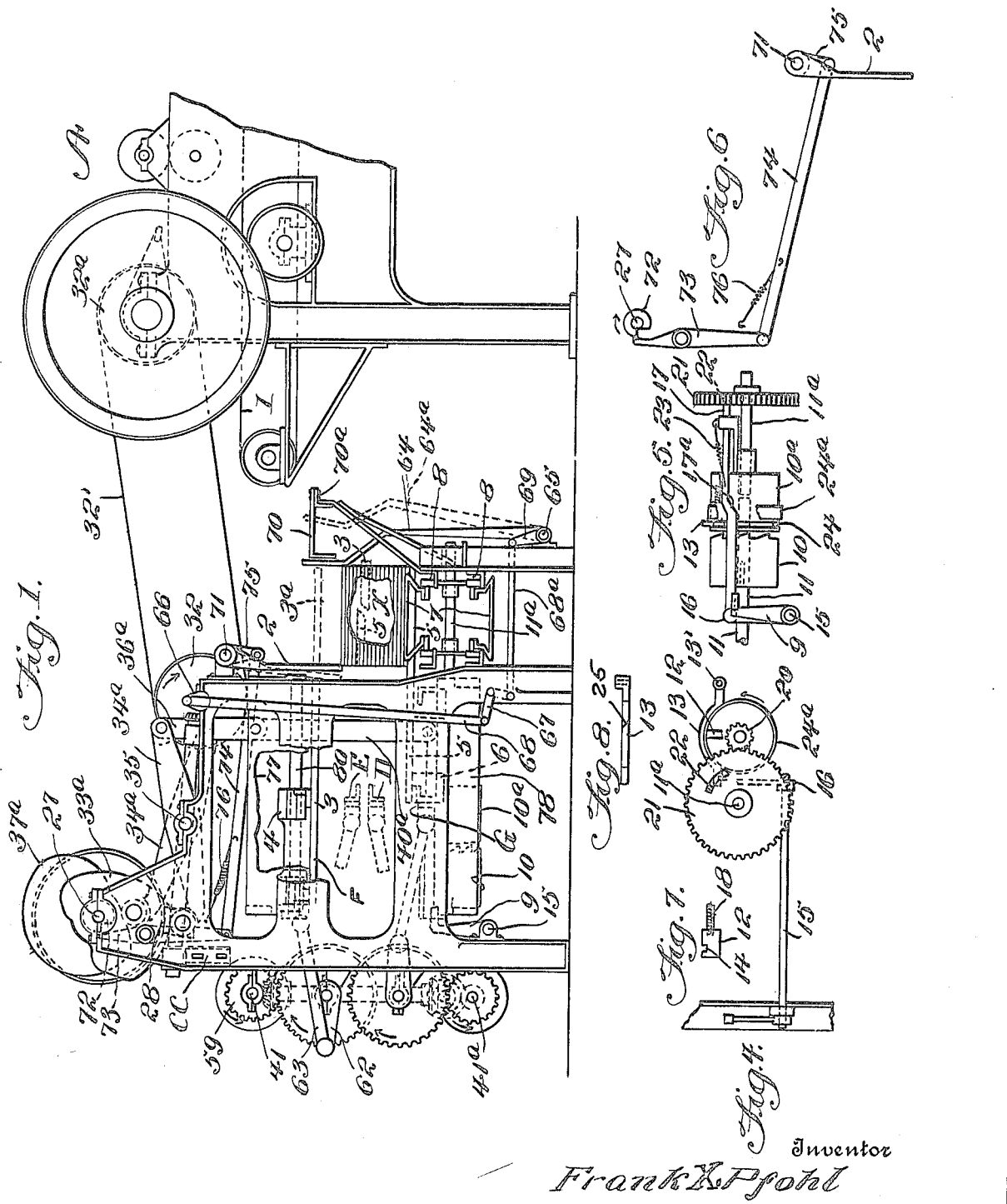
Inventor
Frank X Pfohl
By Spear, Middleton, Donaldson & Hall
Attorney

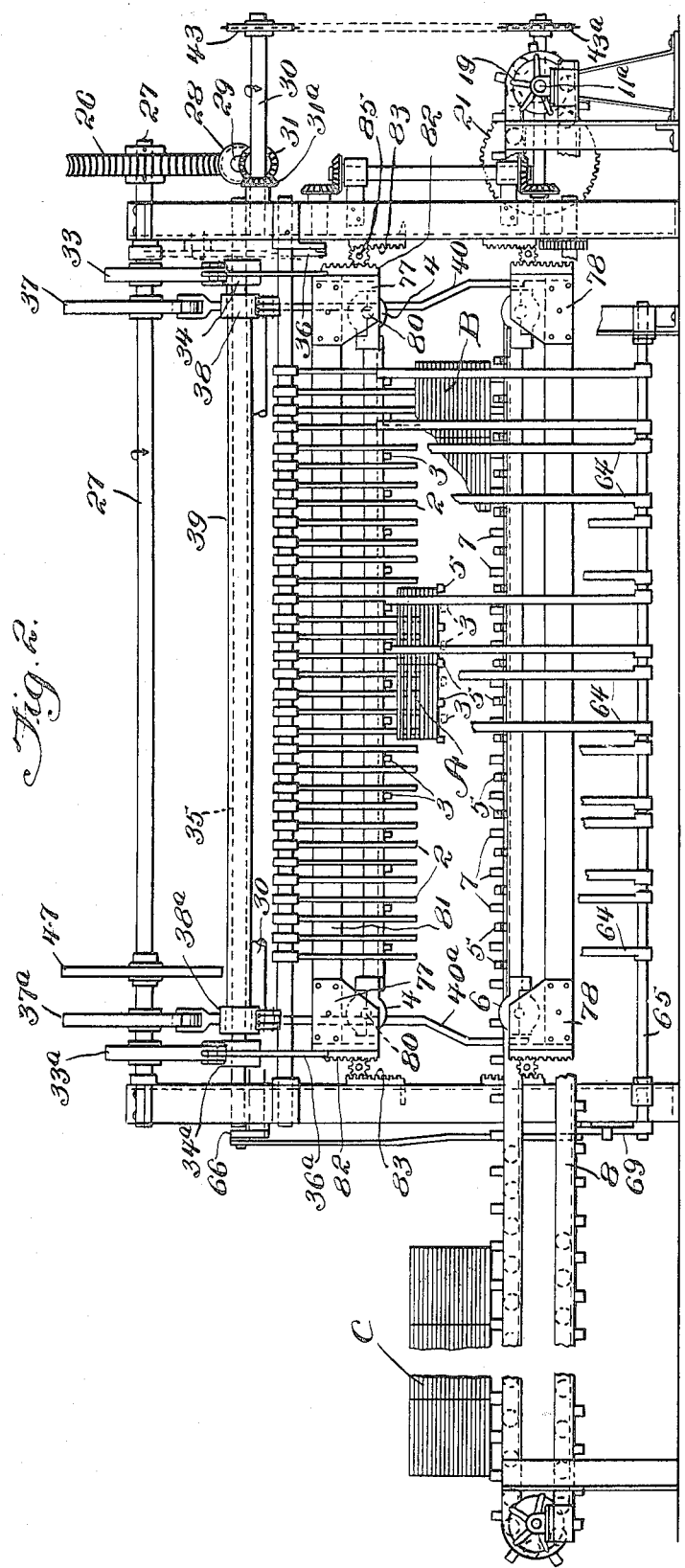

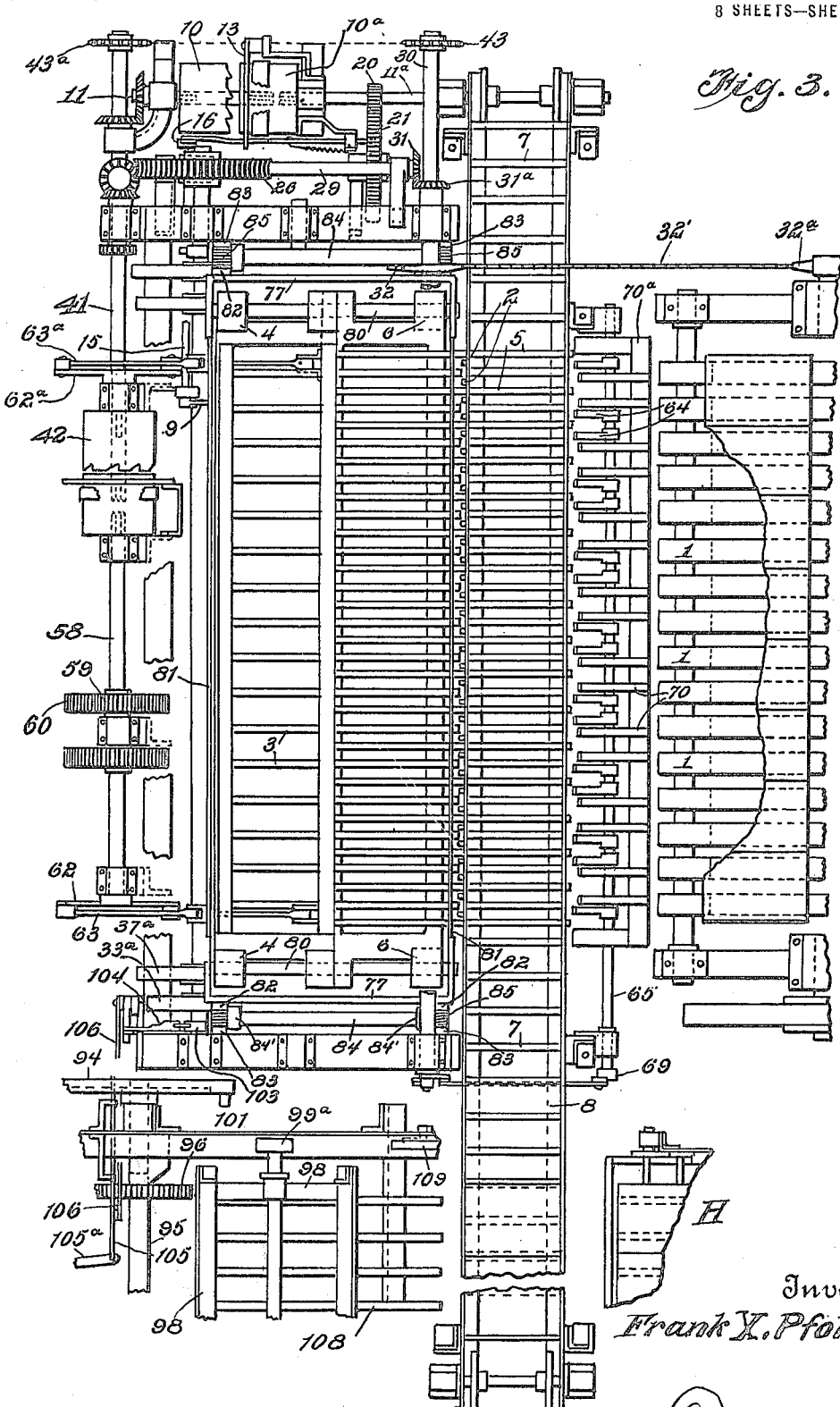

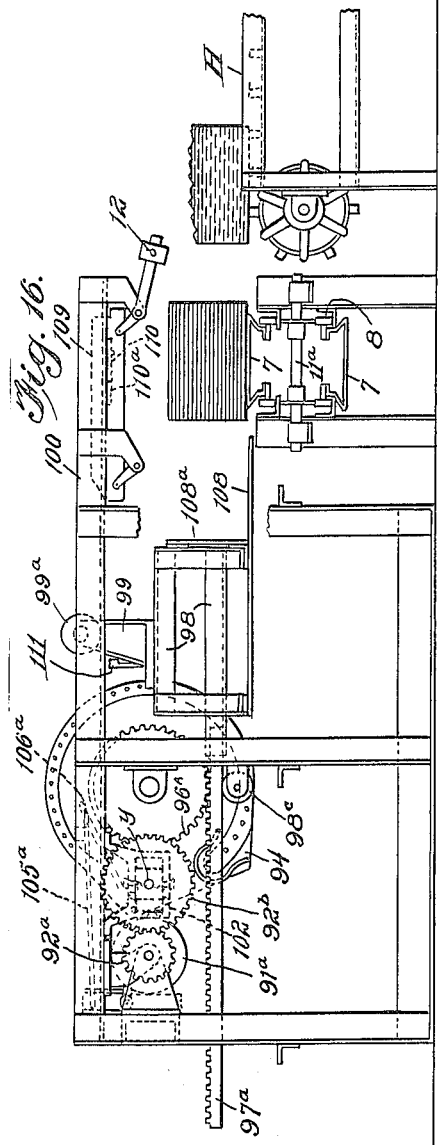

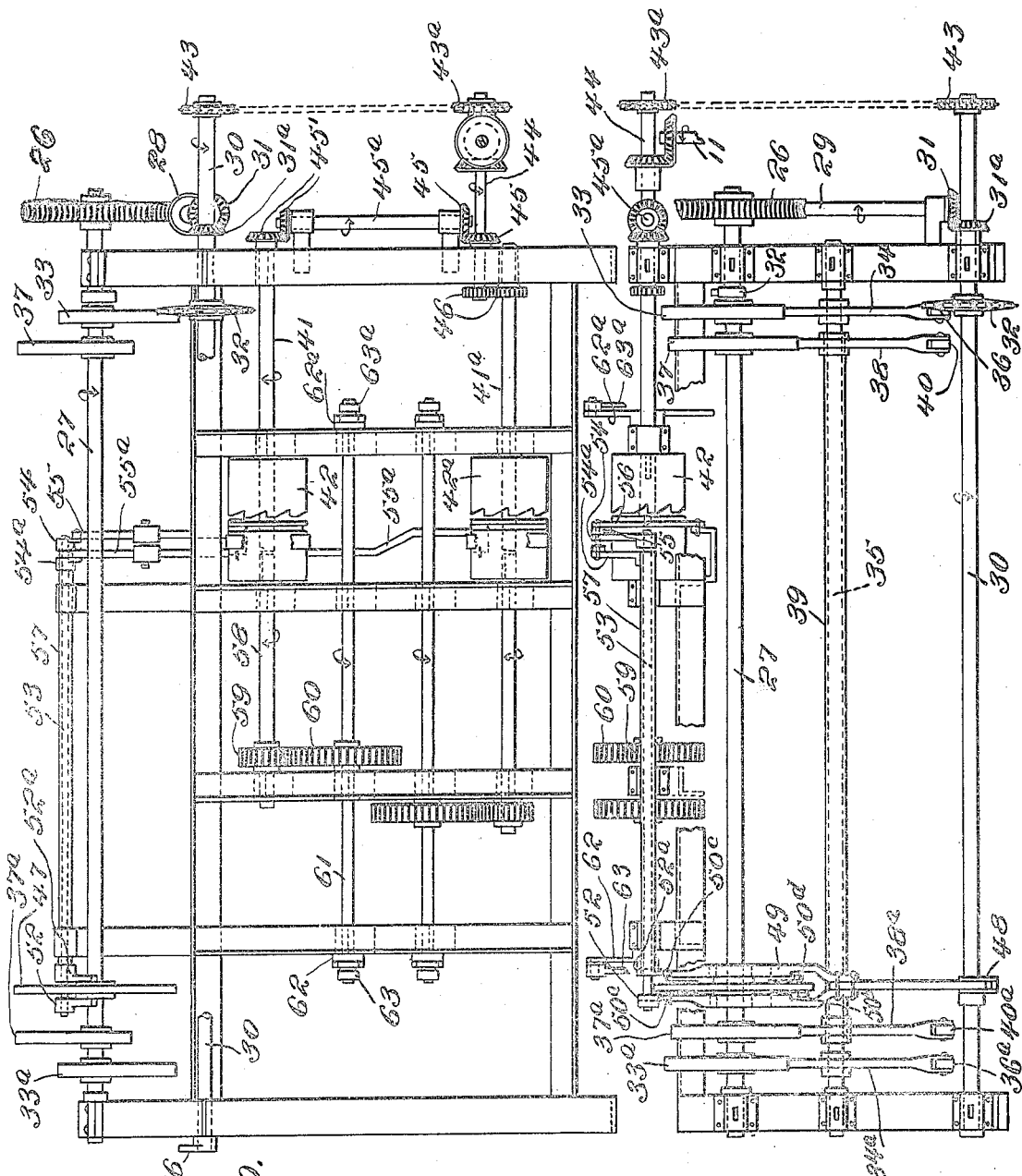

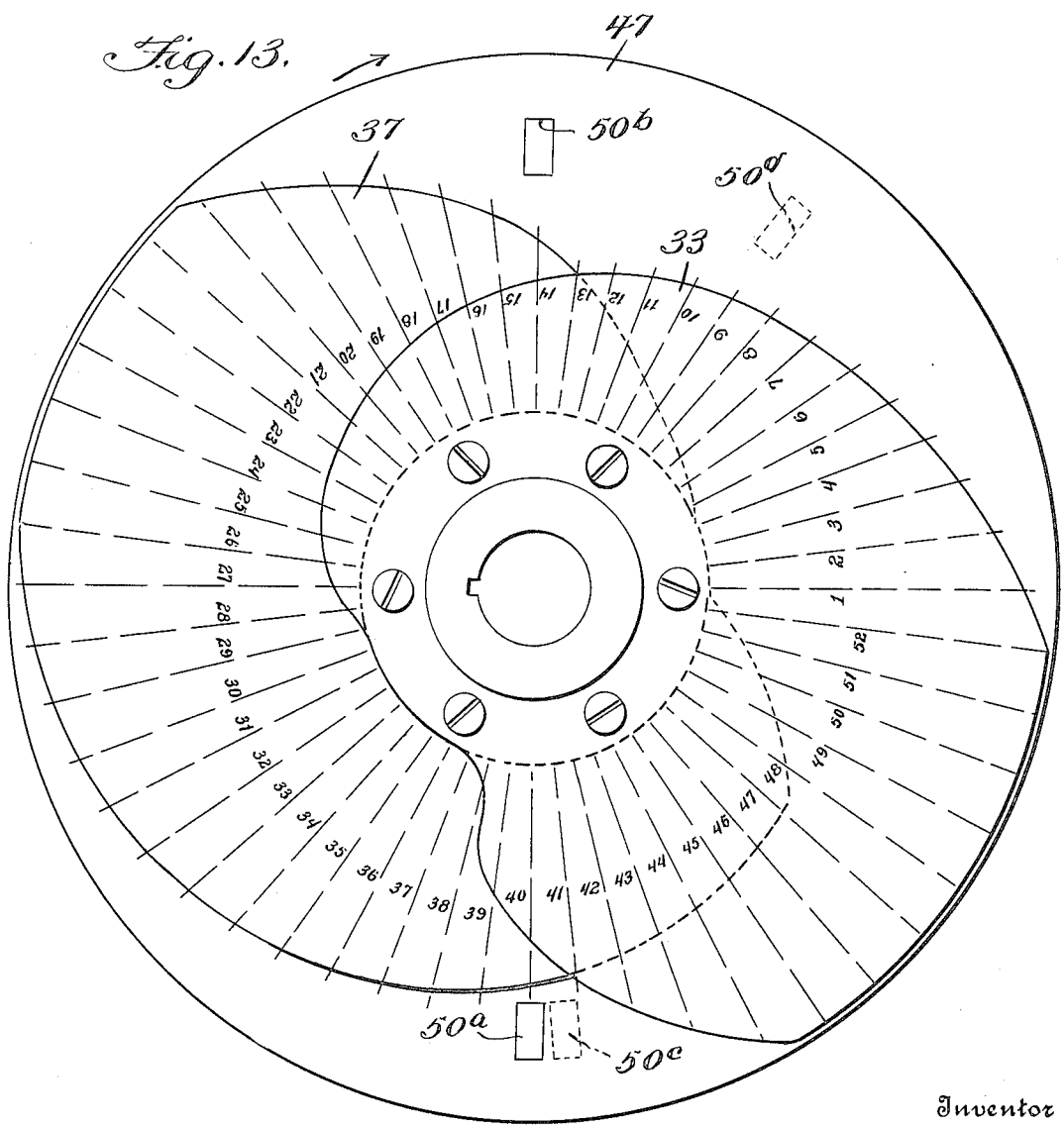

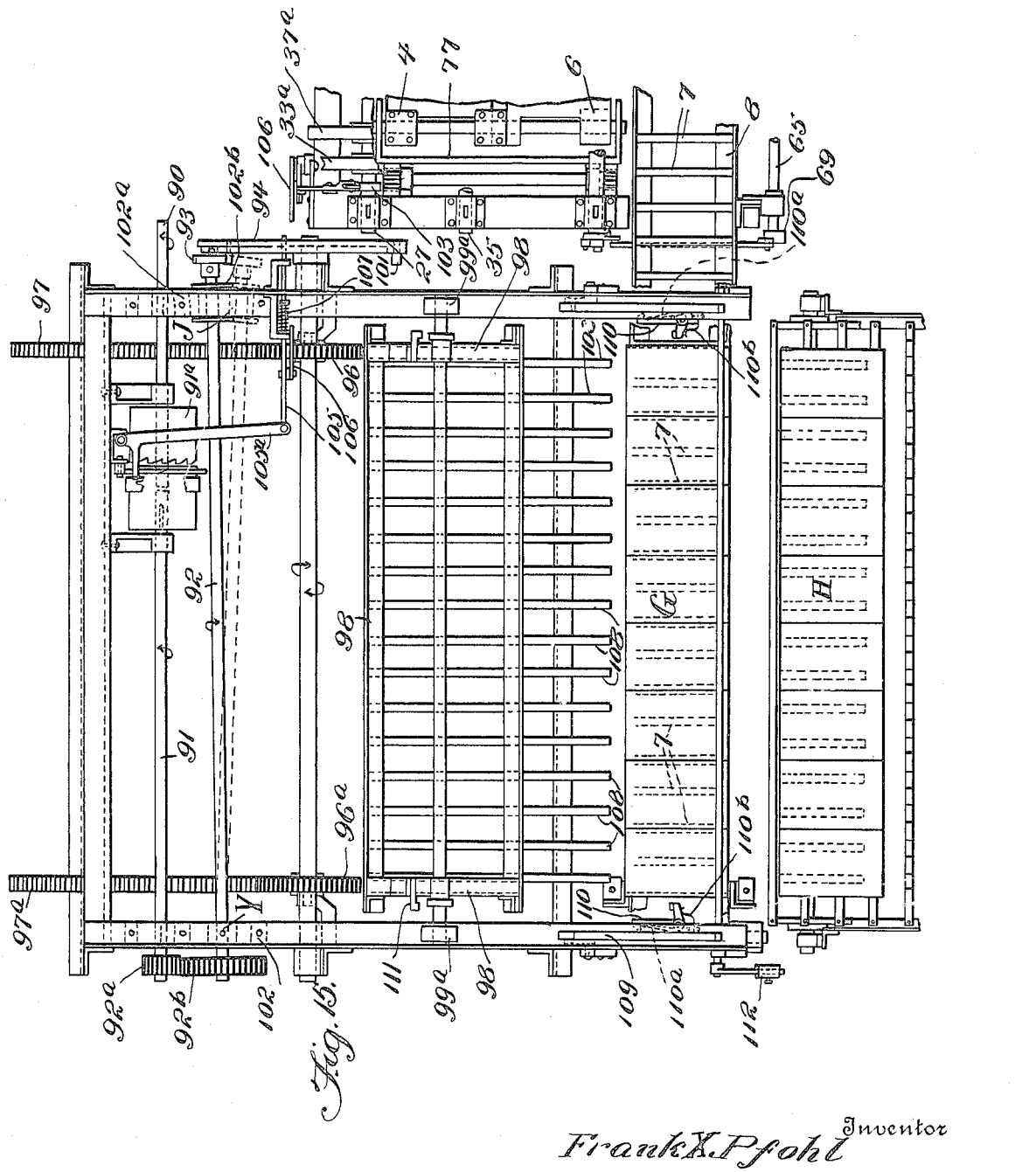

F. X. PFOHL.
AUTOMATIC COUNTING, STACKING, AND TRANSFERRING APPARATUS.
APPLICATION FILED MAY 7, 1920.
1,412,795.
Patented Apr. 11, 1922.
8 SHEETS—SHEET 8.
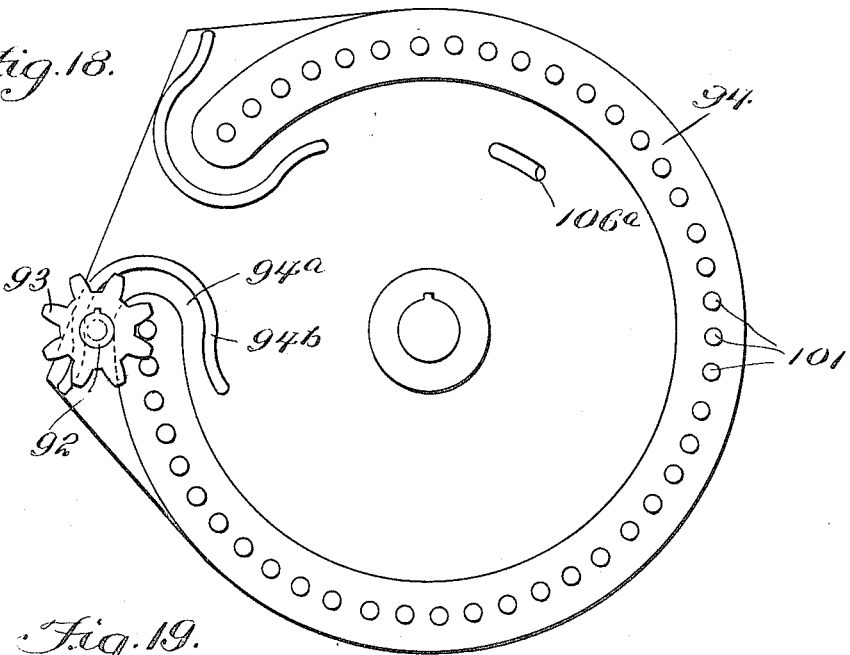
Fig. 18.
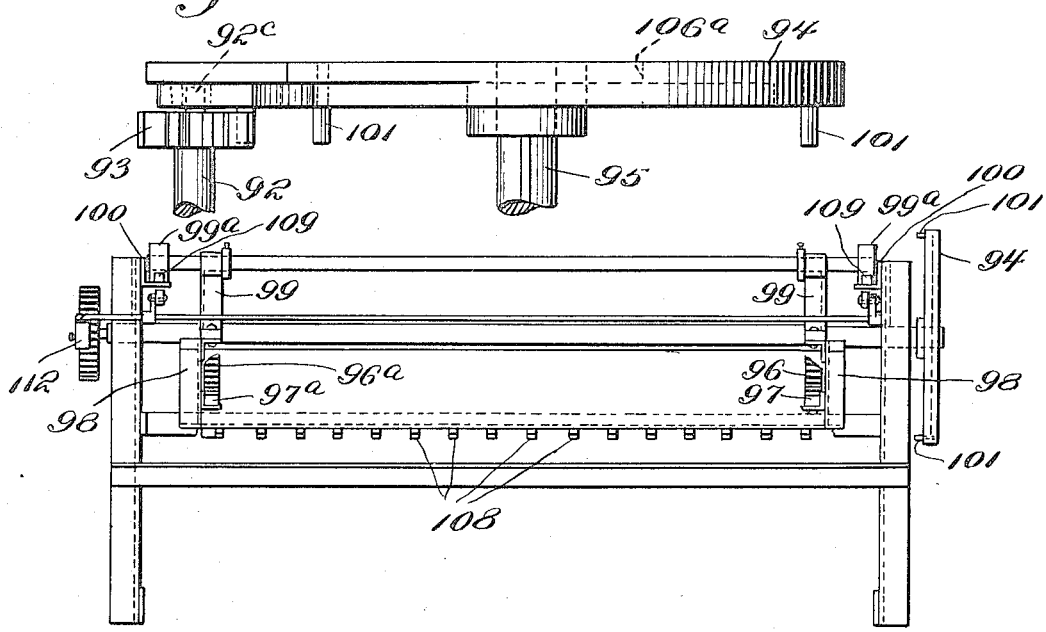
Fig. 19.
Fig. 17.
Inventor
Frank X. Pfohl
By Spear, Middleton, Donaldson & Hall
Attorney

UNITED STATES PATENT OFFICE.

FRANK X. PFOHL, OF BUFFALO, NEW YORK.

AUTOMATIC COUNTING, STACKING, AND TRANSFERRING APPARATUS.

1,412,795.  Specification of Letters Patent.  Patented Apr. 11, 1922.

Application filed May 7, 1920. Serial No. 379,615.

*To all whom it may concern:*

Be it known that I, FRANK X. PFOHL, a citizen of the United States, and resident of Buffalo, in the county of Erie and State of New York, have invented certain new and useful Improvements in Automatic Counting, Stacking, and Transferring Apparatus, of which the following is a specification.

My invention relates to apparatus for counting, stacking and transferring articles which are delivered continuously thereto, for instance, from the machine which produces the said articles, as in the case of roofing shingles and slabs cut from sheets of composite roofing material. It will be understood, however, that while I have shown the machine as adapted to handle composite roofing shingles, this is done by way of illustration of the principle embodied in my invention, and is not to be regarded as restrictive upon the scope of my invention which is defined by the appended claims.

One object of the invention is to provide an organization which will stack the shingles or other articles with rapidity, that will be susceptible of operation with the expenditure of comparatively little power, and in which certainty of operation will be a marked feature.

Another object of the invention is to provide means whereby the point at which the articles are received from the cutting or other apparatus will be kept at one level, thus simplifying the operation of stacking and rendering it certain of accomplishment in a proper manner.

One embodiment of the invention is illustrated in the accompanying drawings, in which:—

Figure 1 is a side elevation of the machine in its relation to the cutting or other apparatus from which the articles are received, only a portion of the latter apparatus being illustrated;

Fig. 2 is a front elevation of my improved machine;

Fig. 3 is a plan view partly in section and with certain parts omitted;

Fig. 4 is a side view of certain clutch controlling mechanism;

Fig. 5 is a front view of a portion of the mechanism shown in Fig. 4;

Fig. 6 is a detail view of an abutment or grating for lining up the articles as they are being stacked and the connections for controlling the said abutment grating;

Fig. 7 is a detail view of a clutch key belonging to the mechanism shown in Figs. 4 and 5;

Fig. 8 is a detail view of a controlling member for the clutch key of Fig. 7;

Fig. 9 is a side elevation of the machine showing only a portion of the mechanism;

Fig. 10 is a front view of the parts shown in Fig. 9;

Fig. 11 is a plan view of certain of the parts shown in Figs. 9 and 10, and other parts in addition thereto;

Fig. 12 is a detail view of a controlling pin or slide;

Fig. 13 is a side view of cams and controlling means, this figure being in the nature of a diagram;

Fig. 14 is a view of the cam hub;

Fig. 15 is a plan, Fig. 16 an elevation and Fig. 17 a front view of the transfer mechanism, and Figs. 18, 19, 20 and 21 show details.

Referring to Fig. 1, I show at A a portion of a cutting machine which forms the articles to be stacked, this being representative of any suitable form of apparatus which will produce the articles, the particular form illustrated being that of a cutting apparatus which will sever the several shingles from a composite sheet of roofing material. This apparatus is provided with a delivery conveyer 1, which discharges the shingles or other articles therefrom and delivers them to the stacking machine which embodies my invention. The conveyer 1 delivers the articles successively to a supporting member consisting of a series of fingers 3 mounted on a carrier frame 4. The articles as delivered from the conveyer 1 upon the fingers 3, when the latter are advanced to the position 3ª shown in Fig. 1 in dotted lines, and are lined up by contacting with a grating or an abutment member 2 made up of a series of vertical depending fingers mounted and operated as will be hereinafter described.

Assuming that the fingers 3 are moved horizontally from the position shown in full lines, Fig. 1 to that shown in dotted lines 3ª, it will be seen that the said fingers are then ready to receive the articles as they are delivered from the conveyer 1. As the articles are delivered in succession onto the fingers 3 in the dotted position 3ª the carrier frame 4 is by a continuous motion lowered so that the point at which the articles are received from the conveyer 1 remains constantly at the same level. After one half of the number of articles predetermined upon are deposited upon the fingers 3 of the carrier frame 4 which, as above stated is descending, the said fingers 3 meet and locate themselves between horizontally extending fingers 5 at the point X in Fig. 1. The fingers 5 are carried by a lower frame 6 which when the frame 4 with the fingers 3 is descending, lies at the point D indicated in dotted lines in Fig. 1. The fingers 5 receive the stack of articles from the fingers 3 and then the frame 6 together with the fingers 5 descend. The fingers 3 after depositing the partly formed stack of articles on the fingers 5 descend at a faster rate of speed than the fingers 5, so that the fingers 3 will deposit the stack on the fingers 5 and thereby be relieved of the load of the stack, this action taking place at the point X above referred to. After this action has taken place the frame 4 carrying the fingers 3 is retracted leftward, Fig. 1, while the lower frame 6 with the grating or fingers 5 is descending and still receiving the articles from the conveyer 1 to make up a stack of the predetermined number of shingles or other articles to form the full pack. The frame 4 after being retracted is elevated vertically to the position shown in full lines in Fig. 1 and it then remains at rest in this position while the lower frame 6 together with the grating 5 continues its descent and the stack continues to be built up.

After the predetermined number of shingles are received on the grating or fingers 5, the frame 4 with the grating or fingers 3 is moved towards the right horizontally so that the said fingers 3 will again resume the position shown in dotted lines 3ª, ready to catch the first shingle or article for starting a new stack. While this action is transpiring, the grating 5 with the stack of shingles now fully built up moves to a position between the cross pieces or flights 7 of the conveyer 8 and as the grating 5 is made to assume a position a little below the upper edges of the cross pieces or flights 7, the complete stack will be deposited on the said flights and the grating 5 will thus be relieved of the load of the stack so that the lower frame 6 carrying this grating 5 may be freely retracted or moved towards the left, Fig. 1, to get into a position to be raised and advanced to receive the first half of the next stack, it being understood that the retracting movement is sufficient to make the front end of the grating or fingers 5 clear the completed stack as the said grating is elevated.

The conveyer 8 is stationary during the time that the stack of shingles is being deposited thereon, by the action just described of the grating or fingers 5, but as soon as the stack has been received on this conveyer 8 it is set in motion by the following mechanism and for starting the conveyer the lower frame 6 is utilized as the means for effecting the starting operation. To this end the lower frame 6 as it is retracted leftward Fig. 1, following the depositing of the stack upon the conveyer 8, strikes a controller arm 9 which renders effective a clutch at 10 to effect the starting of the conveyer. The member 10 is toothed at one end as shown in Figs. 3 and 5, and it is keyed on a shaft 11 which revolves continuously. The complementary clutch member 10ª is keyed to a shaft 11ª axially in line with the shaft 11 and the member 10ª, carries a clutch key 12 having a notch 14 which is engaged by a controller arm 13 pivotally mounted at 13' and resting in a groove 24 of the clutch member 10ª. This controller arm normally holds the clutch key 12 retracted against the opposition of its spring 18. When the frame 6 of the lower grating 5 retracts and strikes the arm 9 it partly rotates the shaft 15 to which the arm 9 is affixed, and another arm 16, which is also keyed to the shaft 15 operates a rod 17, towards the left of Fig. 5, so that the incline 17ª of this rod will lift the controller 13 from the notch 14 of the clutch key 12, and the spring 18 will force the clutch key into engagement with one of the teeth on the clutch member 10 and therefore the clutch member 10ª will be driven in unison with the constantly rotating clutch member 10 and the shaft 11ª will be started in rotation. This shaft as shown in Fig. 3, carries the sprocket wheels 19 which drive the conveyer 8. The conveyer 8 moves the stack of shingles from the point B, Fig. 2, to the point C. The extent of movement of the conveyer is determined by the ratio of the gears 20, 21, the said gear 20 being fixed to the shaft 11ª. Gear 21 is provided with a slot 22, adapted to receive the end of the rod 17. The movement of the rod 17 above mentioned, as made towards the left in Fig. 5 for operating the clutch controller 13, will at the same time withdraw itself from engagement with the slot 22 of the gear 21, and thus the said gear will be free to rotate and this condition will continue until the gear 21 has made one complete revolution and has brought the slot 22 around opposite the end of slide or rod 17, whereupon a spring 23 will cause the rod 17 to reengage the slot 22 and thus the gear 21 will be arrested and as this gear is in mesh with the gear 20 on the shaft 11ª of the conveyer 8, the said conveyer will be brought to rest, it being understood that when the rod 17 moves towards the right, in Fig. 5, to arrest the rotation of the gear 21, the same action will remove the inclined shoulder 17ª from under the free end of the controller arm 13, and thus this arm will move down into its controlling position in the groove 24 and present its inclined shoulder 25 to enter the notch 14 of the clutch key 12 so that this clutch key will be withdrawn from the tooth of the clutch member 10, thus disengaging the clutch and stopping the movement of the conveyer 8. At 24ª a steel band is shown surrounding the clutch member 10ª for retaining the key 12 in position in said member.

The number of shingles or other articles which are to make up the stack is determined by the number of teeth in a worm gear 26 on a shaft 27, suitably journaled in the frame of the machine. The worm gear 26 is driven by a worm 28 on a shaft 29, extending forwardly and driven from a shaft 30, journaled at the top front portion of the machine through beveled gears 31, 31ª, Figs. 1, 2 and 3. The shaft 30 is driven from the cutting machine by a sprocket chain 32′, passing around equal sized sprocket wheels 32, 32ª. The up and downward movement of the frame 4 which carries the upper grating or fingers 3 is accomplished by cams 33, 33ª on the cam shaft 27 which, as before stated, is driven through the worm gear 26. The cams 33, 33ª operate rocker levers 34, 34ª keyed on a rock shaft 35, journaled in the frame of the machine. The cam 33 as shown in Fig. 2 and Fig. 10 is arranged near one end of the cam shaft 27 while the companion cam 33ª is arranged near the opposite end of said shaft so that connections operated by these cams will act at opposite ends of the vertically moved frame 4, these connections, as above indicated, include the rock levers 34, 34ª which are arranged at opposite ends of the shaft 35, and these levers are connected respectively by links 36, 36ª with the frame 77, which carries slidably thereon the reciprocating frame 4 which carries the grating or fingers 3.

The reciprocating frame 6 is moved vertically by a mechanism similar to that just described for the reciprocating frame 4, by cams 37, 37ª which are also keyed on the shaft 27. These cams operate through rocker arms 38, 38ª keyed on a sleeve 39 working upon the rock shaft 35, which later forms a bearing therefor, extending as it does through the said sleeve. The rocker arms 38, 38ª are connected with links 40, 40ª, the lower ends of which are connected with the vertically movable frame 78 which carries the slidable frame or bar 6. The reciprocating bar or frame 4 slides on rods 80, Fig. 3, which are fixed in the supporting frame 77. This frame 77 is made up of end members marked 77 and connecting plates 81, shown in Fig. 3.

In order to guide the frame 77 vertically, it is provided with racks 82, Figs. 2 and 3 at its ends and there are racks 83 fastened to the main frame of the machine. Shafts 84 carry spur gears 85 which mesh with the racks 82 and 83. This allows a free movement of the supporting frame 77 vertically. The shafts 84 and spur gears 85 prevent the support or frame 77 from tipping or getting out of its prescribed horizontal position. Collars 84′ on the shafts 84 bear against the sides of the racks and the spur gears 85 and prevent any side motion of the supporting frame 77. The frame 78 which carries the sliding bar or frame 6 is controlled in a manner similar to that just described for the vertically moving supporting frame 77.

In order to move the grating frames 4 and 6 back and forth horizontally, the following mechanism is provided. Shafts 41, 41ª are mounted at the rear of the machine, Figs. 1, 9 and 10, and respectively carry clutch members 42, 42ª, these parts being driven continuously from the shaft 30 through sprockets 43, 43ª, Fig. 10, the latter being on a shaft 44 which imparts its motion through bevel gears 45 to a shaft 45ª which at its upper end drives the shaft 41 through bevel gears 45′, the lower shaft 41ª being driven from the shaft 44 through the spur gearing 46, the clutch mechanism indicated generally at 42, 42ª are of the same construction as that shown in Figs. 4 and 5, above described, each clutch being controlled by a controller arm shown at 56, 56ª, respectively Fig. 9. The clutches are controlled from a disk 47 keyed on the cam shaft 27 which shaft makes one revolution for each full stack or pack which is built up by the organization. The disk 47 has means which cooperate with a reciprocating member 49, Fig. 9, which is operated from an eccentric 48, mounted on shaft 30 before mentioned. The sliding member 49 is slotted to embrace the hub of the controller disk 47, to be guided thereby. To operate the clutches at 42, 42ª at the prescribed intervals, the controller disk 47 is provided with a series of sliding dogs 50ª, 50ᵇ, 50ᶜ and 50ᵈ, disposed at different points about the same. These sliding dogs are alike in formation and one of them is shown in detail in Fig. 12, it being slidably mounted in a bracket 51 adapted to be fixed to the side face of the controller disk 47, said dog being pressed in one direction by a spring 50ˣ. The sliding dogs 50ª and 50ᵇ are intended to operate a lever 52, Fig. 9, keyed to a rock shaft 53, suitably journaled in the frame of the machine, the said rock shaft at the opposite end from the lever 52, having an arm 54 keyed thereon and connected by a link 55 with the clutch controlling arm 56 of the upper clutch 42, Figs. 9 and 10. Another arm, 52ª is arranged adjacent the disk 47 as shown in the Fig. 10 but near the opposite side or face of said disk from that upon which the arm 52 previously mentioned is located, and this arm is carried by a sleeve 57 mounted upon the shaft 53 and having at its opposite end an arm 54ᵃ connected with a link 55ᵃ, extending down to the clutch controller 56ᵃ of the clutch 42ᵃ. It will be observed from the diagram, Fig. 13, that the dogs 50ᵃ, 50ᵇ are arranged upon one side of the controller disk 47, while the dogs 50ᶜ and 50ᵈ are arranged upon the opposite side or face of the disk so that two of these dogs, 50ᵃ and 50ᵇ will operate in connection with the arm 52, and the other two will operate in connection with the arm 52ᵃ. The disk 47 being on the shaft 27 is in continuous rotation and at intervals the dogs reach a position intermediate of the levers 52, 52ᵃ and slide 49, it being observed from Fig. 11 that the slide 49 is forked so as to embrace the disk 47 and so that its ends will cooperate with the dogs located on opposite sides of the said disk.

Assuming that the dog 50ᵃ reaches a position between the lever 52 and the end of the slide 49, and assuming that when this occurs the slide 49 is performing its leftward stroke, Fig. 9, by reason of the action of the eccentric 48 it will be seen that the dog 50ᵃ will at this time constitute a power transmission device between the slide 49 and the lever arm 52, so that the latter will be operated and the link 55 will be raised to lift the controller arm 56, thus releasing a clutch key like that previously described at 12, and causing the clutch 42 to be operated to turn the shaft 58. The turning of this shaft will impart motion through the gear 59, 60, Figs. 9 and 10, to the shaft 61, which will operate the cranks 62, 62ᵃ carried thereby which cranks are connected with the sliding frame or bar 4, by the rods 63, 63ᵃ and thus the upper grating 3 will be moved horizontally. After the clutch controlling arm is lifted it immediately drops back into position for withdrawing the clutch key so that the clutch will make only one revolution. The gear 59 also makes a full revolution but as this is in the ratio of 2 to 1 in respect to the gear 60, the shaft 61 will only make a half revolution and consequently the bar or grating frame will be moved in only one direction and will then come to rest. The other dogs mentioned above perform similar operations in respect to the clutch controlled thereby.

Briefly stated, the following actions result from the control exerted by these dogs; dog 50ᵃ sets the clutch 42, moving the grating frame 4 to the right, Fig. 1, from the position indicated at F in said figure. Dog 50ᵇ moves the grating frame 4 to the left from the position indicated at E in dotted lines, Fig. 1; dog 50ᶜ moves the grating frame 6 to the left from the position indicated at G in dotted lines, Fig. 1, and dog 50ᵈ moves the said grating frame 6 to the right to the position marked D in dotted lines, Fig. 1.

In order to insure the proper lining up of the articles as they are deposited on the grating frame, I provide a series of jogger arms 64, keyed to a rock shaft 65 which presses the articles against the abutment grating 2. The rock shaft 65 is operated by a crank 66 mounted on the shaft 30, this crank being connected to the bell crank lever 67 by a connecting rod 68 and the bell crank lever is connected to the rock shaft 65 by a link 68ᵃ and an arm 69.

There are a series of guide fingers 70 riveted to a support 70ᵃ Fig. 1, these fingers being located between the accumulating pile of shingles and the source of supply, namely the delivery belt or conveyer 1. These guide fingers 70 are positioned slightly above the delivery point of the articles and they act as a support for any article in case it is not fully delivered against the abutment grating 2, and if this miscarriage of delivery happens and the article is resting partly on the guide fingers 70, the jogger arms 64 moving from the position shown in dotted lines at 64ᵃ Fig. 1 will press the partly delivered shingle against the abutment grating 2, so that the stack will be accordingly lined up. The abutment grating 2 consists of a series of depending arms secured to a shaft 71. This abutment grating is controlled so as to completely free the stack of articles from contact therewith just before the conveyer 8 is started to move the stack from the position B, Fig. 2 leftward. For this purpose the shaft 71 is provided with an arm 75 which is connected by a link 74 to a lever 73, suitably pivoted to the frame and operated by a cam 72 on the cam shaft 27. A spring, 76, exerts pressure on the connections so that when the lower part of the cam 72 comes opposite the end of the lever 73, the spring will exert its force and withdraw the grating frame from contact with the side of the stack so that this will be perfectly free to be moved onward by the conveyer 8 and thus remove all danger of disturbing the stack from the condition in which it is built up. After the stack has been conveyed away, the cam 72 restores the abutment grating to its former position ready to line up the articles for a new stack.

Referring to the diagrammatic view of the cams shown in Fig. 13, we will assume that there are fifty-two teeth in the worm gear 26 which is fixed to the same shaft that the members shown in Fig. 13 are secured to. Each tooth in the worm gear represents a revolution of the cutting machine indicated generally at A, Fig. 1, and also represents each successive delivery made to the automatic stacking mechanism from the conveyer 1 of said cutting apparatus. I have shown the cam means of Fig. 13 with fifty-two imaginary divisions or sections, each representing one delivery action from the conveyer 1, beginning at the division line marked 1 on said diagram. The actions may be carried out as follows, in respect to this diagram.

The grating frame 4 is moved towards the right by the dog 50ª between the radii 52 and 1 of said diagram, so as to catch the first article after its delivery from the conveyer 1. The grating frame 4 descends as the articles are successively delivered. The grating frame 6 at this point in the operation has delivered the prescribed number of shingles to the conveyer 8 and after freeing itself of the load, this frame 6 is retracted leftward by the action of the dog 50ᶜ between the radii or divisions 1 and 2 and the conveyer is then started by the grating frame 6, operating the controller arm 9. At the radius 4 the grating frame 6 ascends vertically, reaching its highest point between the divisions or radii 20 and 21. At this point the dog 50ᵈ moves the grating frame 6 to the right and it remains at rest while the controlling end cam mechanism is performing a movement between the radii or divisions 21 and 26, the grating frame 6 thus being ready to receive the load from the descending grating frame 4. The frame 4 in descending having received one-half of the prescribed number of articles to form the stack, meets and deposits this number on the grating 5 and after this action has been performed the grating frame 3, 4 descends at a faster rate than the grating frame 5, 6, this action taking place while the controlling means of Fig. 13 is rotating between divisions or radii 26, and 30, and in this action the grating frame 3, 4 relieves itself of the load and at the radius 30 the frame 4 is moved leftward by the dog 50ᵇ. Thereafter, the frame 4 begins its vertical movement, arriving at its highest point at the radius 44, and it then remains at rest. The grating 5, 6 after receiving twenty-six, or in other words one-half of the prescribed number of articles from the grating 3, 4, is on its descending movement accumulating the balance of the shingles necessary to form a full pack. From radius 47 up to radius 52, the grating 5, 6 descends at a high rate of speed and meets the conveyer 8 at the radius 52. The purpose of this is to clear the grating frame 3, 4 while the latter is being moved to the right by the dog 50ª at the radius 52. In this movement of the grating 3, 4 it gets in position to catch the first article or shingle for starting a new pack. The grating 6 at the division or radius 52, reaches the conveyer 8, and after relieving itself of its load, it retracts leftward by the action of the dog 50ᶜ, this action taking place between radii 1 and 2, thus completing one cycle of operation with respect to these gratings.

The cams 33, 33ª, 37 and 37ª may be separated and fixed to the cam hub which is shown in Fig. 14. The cams can be removed and other cams added to suit requirements where the material or articles of different thickness or articles more or less in number are to be gathered to make up the pack. All that is required to change the number of articles in a given pack is to remove the worm wheel 26 and replace it with a worm gear having a different number of teeth. Means are provided to adjust the worm 28 on shaft 29 to suit the different sized worm gears by an adjustable bearing supporting the shaft 29, as shown in Fig. 1 at CC. The only power required to operate the machine is that necessary for moving the conveyer 8 with the pack, in addition to that which is required to turn over the empty machine, it being observed that all loads on the gratings 3 and 5 are removed before they change their positions, by retracting or elevating. It will also be seen that the point at which the articles are received from the cutting machine never varies in height and thus certainty of operation of the building up of the stack is insured, because each article needs only to be delivered at the one fixed point and each delivery operation therefor is like all the other delivery operations.

It will be seen from the above that the building up of the stack goes on continuously and the stack is supported up to the moment it is placed at rest on the receiver or conveyer 8. There is no dropping of the stack through space with the attending liability to displacement of the shingles, but control is maintained of the stack up to the time it is deposited on the conveyer by the lower grating, descending to a point below the supporting surface or surfaces of the conveyer.

Furthermore, the delivery of the shingles from the cutting machine goes on continuously at regular intervals. This continuous action being possible because of the movements to which the supporting means or gratings are subjected, it being understood that the lower grating has a quick movement in depositing the completed stack on the conveyer, so that the topmost shingle is quickly lowered from the receiving point in order to get it away for the upper support or grating 3, to be projected forwardly from its retracted position to the position at 3ª, prior to the delivery of the bottom shingle of the new pack. After the conveyer 8 transports the pack to the position C, Fig. 15, the pack is transferred towards the right of said figure and of Fig. 16, onto a conveyer shown at H, and the mechanism for performing this action will now be described in connection with Figs. 15 to 21.

In these figures, 90 indicates a shaft driven continuously from the shaft 30 before mentioned, and this shaft 90 is designed to operate a shaft 91 through a clutch 91ª. A shaft 92 is driven from the shaft 91 through gears 92ª, 92ᵇ. The shaft 92 has a pinion 93 thereon which meshes with a reversing gear 94 shown in detail in Figs. 18 and 19 and in its assembled position in Figs. 15 and 16. This reversing gear is fixed on a shaft 95 to which are keyed two spur gears 96, 96ª. These spur gears mesh with racks 97, 97ª which are connected to a reciprocating carriage 98. Rollers 98ᶜ suitably journaled in the frame furnish supports for the racks. The reciprocating carriage 98 is supported by brackets 99, depending from wheels 99ª, adapted to run on the rails 100, these rails being of angular iron of L-shape, in cross section. The reversing gear 94 has teeth or pins 101 to be engaged by the teeth of the pinion 93, and as this pinion rotates it turns the reversing gear by meshing with the pins and when the last pin of the series reaches the pinion and meshes therewith the said pinion will swing around from the outside of the row of pins to the inside of said row, because the projecting end 92ᶜ of the shaft 92, which carries the said pinion, will pass through the space 94ª formed by the guard 94ᵇ. The pinion 93 will then continue to mesh with the pins 101 but on the inside of the row of pins. The shaft 92 turns in one direction only, but by reason of the pinion and reversing gear 94, a rotary reciprocating motion is imparted to the latter gear. The shaft 92 is pivotally mounted at one end to the block or bracket 102, as indicated at Y, Fig. 15, the other end of the shaft 92 is mounted in a sliding block or bracket, 102ᵇ the movement of which is limited by the walls of a slot in the frame in which slot the shafting bracket 102ᵇ is mounted. By means of the mechanism just described the shaft 95 of the reversing gear 94 will be given a rotary reciprocating movement and through its gears 96, 96ª the racks 97, 97ª will be reciprocated to give a similar movement to the carriage 98. After the conveyer 8 has brought the stack of articles to the position C, Fig. 15, a cam 103 on the cam shaft 27, before described, operates the clutch 91ª, this being done by means of a bell crank 104, 104ª and link 104ᵇ, Figs. 20 and 21, the connection being completed through rod 106 to levers 105 and 105ª. In engaging the clutch 91ª the end of clutch control lever 105 is withdrawn from the slot 106ª in the reversing gear 94. As the gear 94 rotates, the cam 103 releases pressure on the bell crank 104, and the clutch is held in engaged position by the end of the clutch control lever 105, pressing against the web of the reversing gear 94, by the action of the spring 107. The clutch being engaged, the carriage 98 moves to the right, Fig. 15, and the fingers or grating 108 of this carriage enters between the flights 7 of the conveyer 8, beneath the stack of articles at the point C. At about the time the abutment 108ª of the carriage 98 reaches the side of the pack C the wheels 99ª of the carriage ride up the inclined end of rails 109 so that the fingers 108 of the carriage will raise the stack C from the conveyer and move it over the conveyer H, indicated in Figs. 15 and 16. The rails 109 are held in elevated position by hooks 110, engaging projections 110ª upon the rail. When the carriage 98 reaches the end of its stroke to the right, a dog 111 at each side of the carriage will strike the hooks 110 so that the rails 109 then may fall so that the articles will be deposited on the conveyer H. In this action the the weight of the articles together with that of the carriage will overcome the weight 112 which ordinarily would exert its lifting force on the rail 109. As soon as the delivery of the stack to the conveyer H has been accomplished, the shaft 95 reverses its motion and the carriage 98 is moved towards the left. When it completes its leftward movement the clutch 91ª is disengaged by the end of the clutch control lever 105 dropping into the slot 106ª in the reversing gear 94. In other words the clutch is of the one revolution character, the mechanism being such that when the clutch is thrown into operation, it will perform one revolution and then automatically go out of operation.

In the retracting movement of the carriage 98, the wheels 99ª will leave the rails 109 which are now depressed and the weights 112 will elevate the rails and they will be locked in their raised position by the hooks 110.

I claim as my invention:—

1. A machine for stacking articles, comprising a member to receive stacks, and supporting means upon which the stacks are formed by delivering the articles thereto in succession, one upon another, said supporting means having a descending movement as the stack is built up, then a retracting movement away from the receiver followed by an upward movement and then a forward movement to a point over the receiver for receiving the articles for a new stack and means for giving said supporting means the movements specified, substantially as described.

2. A machine for stacking articles, comprising a member to receive stacks of articles, and supporting means to receive the articles, one on top of the other, in succession, to build up the stack, said supporting means having a descending movement as the stack is being built up and at the lower end of the said movement depositing the stack upon the receiver member, following which the said support is retracted laterally from the receiver, then moved upwardly and then forwardly to an elevated position over the receiver to receive articles for a new stack, and means for operating the supporting means.

3. A machine for stacking articles, comprising a member for receiving stacks, having spaced apart members for supporting the stacks, and a support having members to descend into said spaces to deposit the stack on said spaced apart portions of the receiver, while relieving itself of the load of said stack, said support having retracting movement laterally away from the receiver after depositing the stack, followed by an upward movement in its retracted position and a forward movement to a point over the receiver for receiving a new stack and means for giving the said support its specified movements.

4. In combination, in a machine of the class described, a receiver for a stack of articles, a support to receive the articles for the building up of the stack means for lowering the said support as the stack is built up, and for elevating the support after it has deposited the stack on the receiver, and means for moving the support horizontally to retract it from the receiver while in its low position and to advance it over the receiver in its elevated position, substantially as described.

5. In combination, in a machine of the class described, a receiver for a stack of articles, a support to receive the articles for the building up of the stack, means for lowering the said support as the stack is built up, and for elevating the support after it has deposited the stack on the receiver, and means for moving the support horizontally to retract it from the receiver while in its low position and to advance it over the receiver in its elevated position, a vertically movable supporting frame, the said first mentioned support being slidably mounted on said supporting frame, the said lowering and elevating means being connected with the supporting frame and the means for moving the support horizontally being connected thereto, substantially as described.

6. In combination, a receiver for stacked articles, a support upon which a stack is built, means for lowering the support to deposit the stack upon the receiver and for retracting it away from the receiver, then, elevating it and moving it forwardly over the receiver for receiving the articles to make up the next stack, and an upper support upon which the building of the stacks is begun, said upper support having lowering, retracting, elevating, and forward movement generally similar to the support first mentioned, said upper support depositing its partly completed stack upon the first mentioned support and afterwards assuming its elevated forward position, to receive the articles one by one for the building up in part of the next stack, substantially as described.

7. In combination, a receiver for stacked articles, a support upon which a stack is built, means for lowering the support to deposit the stack upon the receiver and for retracting it away from the receiver, then elevating it and moving it forwardly over the receiver for receiving the articles to make up the next stack and an upper support upon which the building of the stacks is begun, said upper support having lowering, retracting, elevating, and forward movement generally similar to the support first mentioned, said upper support depositing its partly completed stack upon the first mentioned support, and afterwards assuming its elevated forward position, to receive the articles one by one for the building up in part of the next stack, each of said supports comprising spaced apart members with the members of the upper support adapted to pass down alongside of the members of the lower support to deposit the stacked articles on the latter, substantially as described.

8. In combination, a receiver having spaced apart supports for stacks of articles, a lower support having spaced apart members to move down alongside the spaced apart supports of the receiver to deposit the articles thereon, and an upper support having spaced apart members for holding the articles and adapted to pass down alongside of the spaced apart members of the lower support to deposit the articles thereon and means for giving each of said supports a lowering movement, a lateral retracting movement, an elevating movement, and a lateral forward movement whereby after depositing the articles each will be restored to position for receiving the articles and performing another cycle of operations, substantially as described.

9. In combination, a receiver for the stacked articles, an upper support for receiving articles one after another to form the lower part of the stack, a lower support to receive the partly formed stack from the upper support and to continue receiving articles in succession for the completion of the stack and means for giving the upper support a descending movement while the lower support is elevated to deposit the partly formed stack of articles thereon and for thereafter retracting said first support and elevating it to an upper position while still retracted, said upper support remaining at rest in its upper retracted position while the building up of the stack continues onto the lower support, means for lowering the lower support as the stack is being completed, said upper support moving forward from its position of rest after the stack is completed on the lower support, said lower support being retracted and elevated after depositing its stack onto the receiver, and then being moved forward over the receiver to receive the partly formed next stack from the upper support, substantially as described.

10. In combination, a receiver for stacked articles, a lower support having descending movement while the stack is being built thereon and movement to deposit the stack of articles onto the receiver, an upper support having lowering movement as the stack is partly built up thereon and to deposit the partly formed stack on the lower support, said upper support having a more rapid movement downward than the lower support after depositing the partly formed stack thereon to relieve itself of the load, said supports each having retracting movement, rising movement and forward movements to get into position for receiving the members of the next stack, and means for giving the supports, said movements, substantially as described.

11. In combination a conveyer moving horizontally and composed of spaced apart cross pieces, means for giving it a step by step movement, a support in the form of a grating upon which the stack of articles is built up, means for building up the stack by delivering the articles one by one to the grating support, the bars of said grating being adapted to enter the spaces between the cross pieces of the conveyer, and means for lowering said support to deposit the stack of articles on the conveyer and for retracting the grating laterally from the conveyer while the latter is at rest, substantially as described.

12. In combination a receiver for stacked articles, a support upon which the articles are stacked to be deposited on the receiver and means for progressively lowering the support vertically and positively in accordance with the individual thickness of the articles successively delivered thereto whereby the receiving point for the articles being stacked is maintained constantly at one height and means for operating the receiver to transport the stack of articles deposited thereon.

13. In a machine for stacking articles, the combination of a member for receiving the stacks, a plurality of members each having a downward movement as the stack is built up thereon, one member operating in a higher plane than the other and receiving the articles to form the first part of the stack, said member delivering the partly completed stack to the other member which then receive further articles as it moves down for the completion of the stack and for delivering the same upon the receiver both of said members returning to their uppermost positions, but in out of time relation, to receive the articles for the next stack.

14. In a machine for stacking articles, the combination of a member for receiving the stacks, a plurality of members each having a downward movement as the stack is built up thereon, one member operating in a higher plane than the other and receiving the articles to form the first part of the stack, said member delivering the partly completed stack to the other member which then receives further articles as it moves down for the completion of the stack and for delivering the same upon the receiver both of said members returning to their uppermost positions, but in out of time relation, to receive the articles for the next stack, said downward movements of the members being continuous, as the stack is being built up thereon.

15. In combination, in a machine for stacking articles a receiver, supporting means upon which the stacks are built up said supporting means having downward movement as the stacks are being built up whereby the point at which the articles are delivered to the said supporting means is maintained at one height and means for operating the said supporting means whereby the building up of one stack after another goes on with continuous delivery of the articles thereto, and the stacks when completed remain under supporting control of said supports until the stack is resting on the receiver, substantially as described.

16. In combination, a receiver for stacked articles a two part support upon which the stacks are built up, one part being above the other and receiving the first part of the stack, means for moving each part downwardly as the stack is built up thereon, the said upper part delivering the partly formed stack to the lower part, means for restoring the upper part to its position for beginning a new stack, the said lower part having an accelerated movement at the last part of its downward stroke, to deliver the stack onto the receiver and lower the upper part of said stack from the receiving point to permit the upper stack supporting part to reach its position for beginning a new stack before the first article is delivered to the receiving point, substantially as described.

17. In combination, a receiver for the stacks, a plurality of gratings having movement substantially vertically towards said receiver and means for giving the gratings a movement horizontally to and from the path of their vertical movement, said grating receiving the articles to form the stacks as they are moving towards the receiver.

18. In combination, a receiver for the stacks of articles, a stacker mechanism comprising two vertically movable members upon which the articles are deposited to form the complete stack and means for giving the said stacker members, a downward movement continuously as the articles continue to be deposited thereon, said means including worm gearing, and connections operated thereby, substantially as described.

19. In combination, a receiver for a stack of articles, a pair of supports or gratings for receiving the articles to form the stacks, a cam shaft, cams for giving the supports vertical movement and means for giving the supports horizontal movement, including clutches and connections operated thereby and means for controlling the clutches, substantially as described.

20. In combination, a receiver for the stacks, a pair of supports for receiving the articles to form the stacks, a cam shaft, cams for giving the supports vertical movement and means for giving the supports horizontal movement, including clutches and connections operated thereby and means for controlling the clutches, said clutches being of the one-revolution character, substantially as described.

21. In combination, in a machine for stacking articles a conveyer, driving means therefor for moving the conveyer at intervals, supporting means upon which the stacks are built up, said supporting means having vertical movement and also horizontal retracting movement, clutch means for controlling the driving means of the conveyer and means for controlling the operation of the clutch means, said controlling means being in turn controlled by the retracting movement of the support, substantially as described.

22. In combination, with a conveyer, a two-part support upon which the articles are deposited for the formation of the stack, a cam shaft, cams thereon, connections from the said cams for giving the members of the two part support vertical movement, means for giving the members of the two-part support horizontal reciprocating movement to and from the vertical path of movement of said members, clutches for operating said reciprocating means and cams with connections for controlling the clutches, substantially as described.

23. In combination with a receiver, for the stacked articles a pair of vertically moving members for receiving the articles for the formation of the stack, one of said members being operative in a plane above the operative plane of the other member, cams with connections for giving the said members vertical movement, means for giving the said members a horizontal movement to and from their vertical path of movement, clutches for operating said means and means for controlling the clutches, comprising a controller disk having rotary movement, sliding dogs thereon, means for operating the said dogs when they are brought thereto by the rotation of the controller disk and connections operated by the movement of the dogs for controlling the clutches, substantially as described.

24. In combination with a receiver for the formed stack of articles, a pair of gratings, horizontally reciprocating members carrying the said gratings, a frame for each grating furnishing a support for the reciprocating members, means for operating the said frames vertically and means for reciprocating the said members on the frames and to and from the vertical path of movement of said gratings, substantially as described.

25. In combination with a receiver for the formed stack of articles a pair of gratings horizontally reciprocating members carrying the said gratings, a frame for each grating furnishing a support for the reciprocating members, means for operating the said frames vertically and means for reciprocating the said members on the frames and to and from the vertical path of movement of said gratings, said reciprocating means comprising crank arms, and links connecting them with the reciprocating members, clutches controlling the operation of the crank arms and means for controlling the clutches, substantially as described.

26. In combination with a conveyer transfer mechanism for transferring articles from said conveyer comprising a reciprocating carriage having means to engage beneath the articles and means for lifting the carriage with said means after the articles have been engaged, the said carriage then moving onward to transfer the articles, substantially as described.

27. In combination with a conveyer for transporting articles, transfer mechanism for taking the articles from said conveyer and to a point of delivery, said mechanism including a reciprocating carriage having means to engage beneath the articles on the conveyer, rails for elevating the reciprocating carriage as it moves forward after engaging the articles, said rails having vertical movement, means for holding the rails in elevated position and trip means operated by the forward movement of the carriage for releasing said rails to fall and allow the carriage to drop, substantially as described.

28. In combination with a conveyer, for transporting articles, transfer mechanism for taking the articles from said conveyer and to a point of delivery, said mechanism including a reciprocating carriage having means to engage beneath the articles on the conveyer, rails for elevating the reciprocating carriage as it moves forward after engaging the articles, said rails having vertical movement, means for holding the rails in elevated position and trip means operated by the forward movement of the carriage for releasing said rails to fall and allow the carriage to drop, and means for raising the rails to be engaged by the trip means, substantially as described.

29. In combination with a conveyer, means for transferring articles from said conveyer comprising a reciprocating carriage operating at right angles to the direction of movement of the conveyer, and means for reciprocating the carriage comprising a reversing gear, a pinion engaging therewith, said pinion having besides its ordinary motion a shifting movement to engage the inside and outside of the toothed portion of the reversing gear, whereby the continuous rotary movement of the pinion in one direction will impart a reciprocating rotary movement to the reversing gear, substantially as described.

30. A machine for stacking articles comprising a receiver upon which the stacks are deposited and means upon which the stacks are built up, by feeding the articles thereto and depositing them one on top of another, said means having progressive movement towards the receiver as the stacks are being built up, said progressive movement being timed to accord with the rate of building of the stack, said means maintaining control over the stack until it is deposited upon the receiver, substantially as described.

31. In combination a traveling conveyer for the stacks, supporting means upon which the stacks are built up, said means having movement towards the receiver for depositing the stacks thereon, an abutment for lining up the stacks, means for withdrawing the abutment when the conveyer transports the stack and means for feeding the articles to the supporting means in a direction transversely of the conveyer from one side thereof and against the abutment lying on the other side thereof, the withdrawal of the said abutment taking place laterally in respects to the course of the conveyer, substantially as described.

32. In combination, a conveyer having spaced apart cross bars, a one revolution clutch, driving means between said clutch and conveyer for driving the latter step by step, a grated support for the articles, means for moving the support to locate its grating between the bars of the conveyer and to withdraw them therefrom and means for driving the one revolution clutch when the support is withdrawn from the conveyer, substantially as described.

33. In combination, a conveyer, a movable support upon which the articles are stacked to be delivered to the conveyer, a cam shaft with connections therefrom for operating the said support, a gear for driving said cam shaft having its teeth of a number corresponding to the number of articles to be stacked, said gear being interchangeable with other gears having different numbers of teeth for different stacks and an adjustable gear to mesh with the interchangeable gear, substantially as described.

In testimony whereof, I affix my signature.

FRANK X. PFOHL.